United States Patent
Dang et al.

(10) Patent No.: US 11,487,387 B2
(45) Date of Patent: Nov. 1, 2022

(54) METHOD FOR DRIVING DISPLAY PANEL INTEGRATED WITH TOUCH FUNCTION, DISPLAY MODULE AND DISPLAY DEVICE INCLUDING THE SAME

(71) Applicants: Chongqing BOE Optoelectronics Technology Co., Ltd., Chongqing (CN); BOE Technology Group Co., Ltd., Beijing (CN)

(72) Inventors: Kangpeng Dang, Beijing (CN); Cheng Zuo, Beijing (CN); Hong Chen, Beijing (CN); Yuansheng Tang, Beijing (CN); Kuan Li, Beijing (CN); Bo Wang, Beijing (CN); Xiong Guo, Beijing (CN); Zhongli Luo, Beijing (CN); Ming Gao, Beijing (CN); Dayu Zhang, Beijing (CN)

(73) Assignees: CHONGQING BOE OPTOELECTRONICS TECHNOLOGY CO., LTD., Chongqing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/356,802

(22) Filed: Jun. 24, 2021

(65) Prior Publication Data
US 2022/0206661 A1 Jun. 30, 2022

(30) Foreign Application Priority Data
Dec. 24, 2020 (CN) .......................... 202011546239.0

(51) Int. Cl.
*G06F 3/041* (2006.01)
*G06F 3/0354* (2013.01)

(52) U.S. Cl.
CPC ........ *G06F 3/04184* (2019.05); *G06F 3/0412* (2013.01); *G06F 3/04162* (2019.05); *G06F 3/03545* (2013.01)

(58) Field of Classification Search
CPC ............ G06F 3/04184; G06F 3/04162; G06F 3/0412; G06F 3/03545
See application file for complete search history.

(56) References Cited

U.S. PATENT DOCUMENTS

2021/0124449 A1* 4/2021 Jang .................. G06F 3/0412

* cited by examiner

*Primary Examiner* — Lisa S Landis
(74) *Attorney, Agent, or Firm* — Nath, Goldberg & Meyer; Joshua B. Goldberg

(57) ABSTRACT

The present disclosure provides a method for driving a display panel, a display module and a display device. The display panel includes a touch electrode. The method includes: in a touch stage, providing a touch signal to the touch electrode. The touch stage includes: a first touch sub-stage and a second touch sub-stage spaced from each other; the touch signal includes: an uplink signal and a touch driving signal, and an active level of the uplink signal is higher than an active level of the touch driving signal. In the first touch sub-stage, the uplink signal is provided to the touch electrode; and in the second touch sub-stage, the touch driving signal is provided to the touch electrode.

13 Claims, 3 Drawing Sheets

METHOD FOR DRIVING DISPLAY PANEL INTEGRATED WITH TOUCH FUNCTION, DISPLAY MODULE AND DISPLAY DEVICE INCLUDING THE SAME

CROSS-REFERENCE TO RELATED APPLICATION

This application claims the benefit of priority to Chinese Patent Application No. 202011546239.0 filed on Dec. 24, 2020 to China National Intellectual Property Administration, the contents of which are incorporated herein in their entirety by reference.

TECHNICAL FIELD

The present disclosure belongs to the field of display technology, and particularly relates to a method for driving a display panel, a display module and a display device.

BACKGROUND

Currently, a display panel has both a display function and a touch function, and a touch electrode for realizing the touch function can be reused as a common electrode. In a display stage, a common signal may be input to the common electrode, and in a touch stage, a touch signal may be input to the touch electrode. When a user needs to use a stylus to operate on the display panel, an uplink signal needs to be input to the touch electrode in the touch stage, so that when the stylus is close to or in contact with the display panel, the stylus can detect the uplink signal from the display panel, and thus the stylus can send a signal to the display panel according to the protocol requirement.

SUMMARY

As a first aspect, the present disclosure provides a method for driving a display panel. The display panel includes a touch electrode. The method includes: in a touch stage, providing a touch signal to the touch electrode. The touch stage includes: a first touch sub-stage and a second touch sub-stage spaced from each other; the touch signal includes: an uplink signal and a touch driving signal, and an active level of the uplink signal is higher than an active level of the touch driving signal. In the first touch sub-stage, the uplink signal is provided to the touch electrode; and in the second touch sub-stage, the touch driving signal is provided to the touch electrode.

In an embodiment of the present disclosure, the display panel further includes a pixel electrode, and the method further includes: in a display stage, providing a data signal to the pixel electrode. The touch stage includes a plurality of touch sub-stages containing the first touch sub-stage and the second touch sub-stage, the display stage includes a plurality of display sub-stages, and the plurality of touch sub-stages alternate with the plurality of display sub-stages.

In an embodiment of the present disclosure, the first 1~2 touch sub-stages of the plurality of touch sub-stages each are the first touch sub-stage, and the rest of the touch sub-stages each are the second touch sub-stage.

In an embodiment of the present disclosure, the plurality of touch sub-stages includes only one first touch sub-stage. In a part of the first touch sub-stage, the uplink signal is provided to the touch electrode; and in the remaining part of the first touch sub-stage, the touch driving signal is provided to the touch electrode. In the entire second touch sub-stage, the touch driving signal is provided to the touch electrode.

In an embodiment of the present disclosure, a number of pulses of a touch synchronization signal within a display time of one frame is N, where N is an integer greater than 1. In response to the touch synchronization signal and a vertical synchronization signal being both at active levels, the number of pulses of the touch synchronization signal starts to be counted; in response to the number of pulses of the touch synchronization signal being counted to N, a modulation signal having a first level and a second level is provided; in response to the first level of the modulation signal, the uplink signal is provided to the touch electrode; in response to the second level of the modulation signal, the touch driving signal is provided to the touch electrode.

In an embodiment of the present disclosure, the display panel further includes a plurality of gate lines and a plurality of data lines intersecting with each other to define a plurality of pixel units. The method further includes: applying signals with the same waveform as the touch signal to the plurality of gate lines and the plurality of data lines in the touch stage.

In an embodiment of the present disclosure, the method further includes: in. the display stage, providing a common level signal to the touch electrode.

As a second aspect, the present disclosure provides a display module, including: a display panel and a driving circuit. The display panel includes a touch electrode. The driving circuit is configured to provide a touch signal to the touch electrode in a touch stage. The touch stage includes: a first touch sub-stage and a second touch sub-stage spaced from each other; the touch signal includes: an uplink signal and a touch driving signal, and an active level of the uplink signal is higher than an active level of the touch driving signal. The driving circuit is configured to: provide the uplink signal to the touch electrode in the first touch sub-stage; and provide the touch driving signal to the touch electrode in the second touch sub-stage.

In an embodiment of the present disclosure, the driving circuit includes: a modulation sub-circuit, a first selection sub-circuit, and a second selection sub-circuit. The modulation sub-circuit is configured to generate a modulation signal having a first level and a second level; a duration of the first level is the same as a time during which the uplink signal is provided to the touch electrode; a duration of the second level is the same as a time during which the touch driving signal is provided to the touch electrode. The first selection sub-circuit is configured to generate the uplink signal using a first power supply voltage signal according to the first level of the modulation signal. The second selection sub-circuit is configured to generate the touch driving signal using a second power supply voltage signal according to the second level of the modulation signal.

In an embodiment of the present disclosure, the modulation sub-circuit includes: a gate circuit and a counter. A first input terminal of the gate circuit is configured to receive a touch synchronization signal, a second input terminal of the gate circuit is configured to receive a vertical synchronization signal, an output terminal of the gate circuit is coupled to a first input terminal of the counter, and the gate circuit is configured to output a start signal through the output terminal in response to the touch synchronization signal and the vertical synchronization signal both being at active levels. A second input terminal of the counter is configured to receive the touch synchronization signal, a third input terminal of the counter is coupled to a counting signal terminal, an output terminal of the counter is coupled to the first selection sub-circuit and the second selection sub-circuit, and the counter is configured to start counting a number of pulses of the touch synchronization signal in response to the start signal; and output the modulation signal through the output terminal in response to the number of pulses of the touch synchronization signal being counted to N.

In an embodiment of the present disclosure, the first selection sub-circuit includes: a first diode, a first transistor, a second transistor, a third transistor, a fourth transistor, and a fifth transistor. A first electrode of the first diode is coupled to an output terminal of the modulation sub-circuit and a control electrode of the fourth transistor, and a second electrode of the first diode is coupled to a control electrode of the third transistor. A control electrode of the first transistor is coupled to a first node, a first electrode of the first transistor is coupled to a first power supply voltage terminal, and a second electrode of the first transistor is coupled to a second node. A control electrode of the second transistor is coupled to the second node, a first electrode of the second transistor is coupled to the first power supply voltage terminal, and a second electrode of the second transistor is coupled to the first node. A first electrode of the third transistor is coupled to the first node, and a second electrode of the third transistor is coupled to a third power supply voltage terminal. A first electrode of the fourth transistor is coupled to the second node, and a second electrode of the fourth transistor is coupled to the third power supply voltage terminal. A control electrode of the fifth transistor is coupled to the second node, a first electrode of the fifth transistor is coupled to the first power supply voltage terminal, a second electrode of the fifth transistor is coupled to a touch signal line, and the touch signal line is coupled to the touch electrode.

In an embodiment of the present disclosure, the second selection sub-circuit includes: a second diode, a sixth transistor, a seventh transistor, an eighth transistor, a ninth transistor, and a tenth transistor, A first electrode of the second diode is coupled to the output terminal of the modulation sub-circuit and a control electrode of the eighth transistor, and a second electrode of the second diode is coupled to a control electrode of the ninth transistor. A control electrode of the sixth transistor is coupled to a third node, a first electrode of the sixth transistor is coupled to a second power supply voltage terminal, and a second electrode of the sixth transistor is coupled to a fourth node. A control electrode of the seventh transistor is coupled to the fourth node, a first electrode of the seventh transistor is coupled to the second power supply voltage terminal, and a second electrode of the seventh transistor is coupled to the third node. A first electrode of the eighth transistor is coupled to the fourth node, and a second electrode of the eighth transistor is coupled to the third power supply voltage terminal. A first electrode of the ninth transistor is coupled to the third node, and a second electrode of the ninth transistor is coupled to the third power supply voltage terminal. A control electrode of the tenth transistor is coupled to the third node, a first electrode of the tenth transistor is coupled to the second power supply voltage terminal, and a second electrode of the tenth transistor is coupled to the touch signal line.

In an embodiment of the present disclosure, the first transistor, the second transistor, the fifth transistor, the sixth transistor, the seventh transistor, and the tenth transistor are all P-type transistors, and the third transistor, the fourth transistor, the eighth transistor, and the ninth transistor are all N-type transistors.

In an embodiment of the present disclosure, a voltage of the first power supply voltage terminal is higher than a voltage of the second power supply voltage terminal, and the voltage of the second power supply voltage terminal is higher than a voltage of the third power supply voltage terminal.

As a third aspect, the present disclosure provides a display device including the display module according to the present disclosure.

DETAILED DESCRIPTION

In order that one of ordinary skill in the art will better understand the technical solutions of the present disclosure, the following detailed description is given with reference to the accompanying drawings and the specific embodiments.

Unless defined otherwise, technical or scientific terms used herein shall have the ordinary meanings as understood by one of ordinary skill in the art to which the present disclosure belongs. The words "first", "second", and the like used herein are not intended to indicate any order, quantity, or importance, but rather are used to distinguish one component from another. Similarly, the word "a", "an", "the" or the like do not denote a limitation of quantity, but rather denote the presence of at least one. The word "include", "comprise" or the like means that the element or item preceding the word encompasses the element or item listed after the word and its equivalent, but does not exclude other elements or items. The word "connect", "couple" or the like is not restricted to physical or mechanical connection, but may include electrical connection, whether direct or indirect, The words "upper", "lower", "left", "right", and the like are used only to indicate relative positional relationships, and when the absolute position of the object being described is changed, the relative positional relationship may also be changed accordingly.

Figure 1:
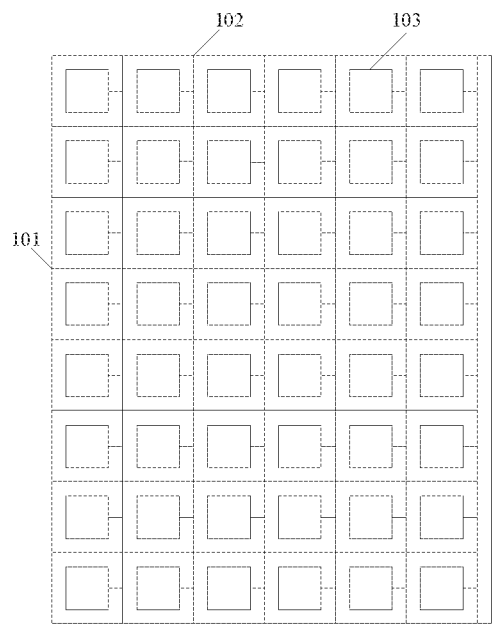
FIG. 1 is a schematic diagram of a structure of an exemplary display panel.
Figure 2:
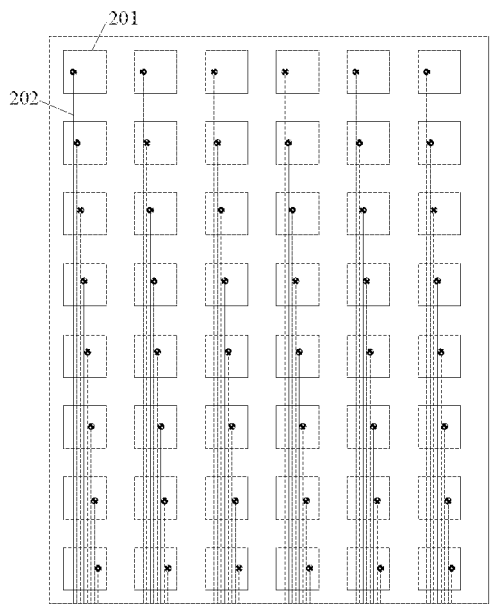
FIG. 2 is a schematic diagram of a structure of an exemplary touch panel.

FIG. 1 is a schematic diagram of a structure of an exemplary display panel, As shown in FIG. 1, the display panel includes: a plurality of gate lines 101 and a plurality of data lines 102 intersecting with each other, and a plurality of sub-pixels 103 defined by the plurality of gate lines 101 and the plurality of data lines 102. In a display stage, a scan signal may be input to the sub-pixels 103 through the gate lines 101, so that the sub-pixels 103 are turned on row by row, and at the same time, data signals are input to the sub-pixels 103 through the data lines 102, thereby achieving the display function of the display panel. The display panel may be various types of display panels, such as a liquid crystal display panel, an organic light emitting display panel, or a plasma light emitting display panel. The gate lines 101, the data lines 102 and the sub-pixels 103 may be arranged according to the type of the display panel. FIG. 2 is a schematic diagram of a structure of an exemplary touch panel. As shown in FIG. 2, the touch panel includes: a plurality of touch electrodes 201, and a plurality of touch signal lines 202 coupled to the touch electrodes 201. In a touch stage, a touch signal may be input to the touch electrodes 201 through the touch signal lines 202, thereby achieving the touch function of the touch panel. In practical applications, the touch panel of the display module may be disposed outside the display panel, i.e., to have an on-cell structure, or the touch panel may be embedded inside the display panel, i.e., to have an in-cell structure.

Figure 3:
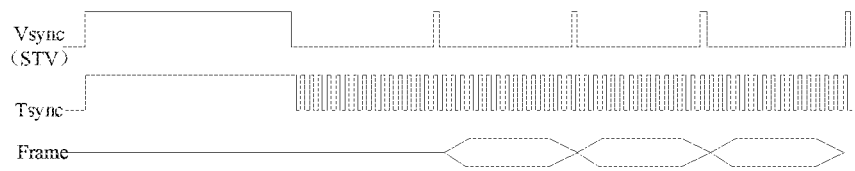
FIG. 3 is an exemplary timing diagram for driving a display panel.

In the on-cell display module, because the touch function and the display function are synchronously performed on a time axis, the timing thereof is relatively simple, and the synchronization of a frame of data signals can be implemented by using a frame start signal STV; and since the touch panel is outside the display panel, the touch electrode 201 itself in the touch panel is unlikely to generate a stray capacitance with the gate line 101 and the data line 102 in the display panel. In the in-cell display module, as shown in the timing diagram of FIG. 3, a touch synchronization signal Tsync is required to implement control and synchronization of the display function and the touch function according to the protocol requirement. For example, when the touch synchronization signal Tsync is at a high level, display is performed, and when the touch synchronization signal Tsync is at a low level, touch control is performed. At the beginning of each frame of display image, it is necessary to transmit an uplink signal during the first low level stage of the touch synchronization signal Tsync, for setting the driving frequency of the stylus, the state of the stylus, the protocol of the stylus, and the like, so that the synchronization can be performed subsequently according to the setting. If there is a problem with the transmission of the uplink signal, it is likely that the function of the stylus will be abnormal, and the touch function cannot be implemented by using the stylus.

Figure 4:
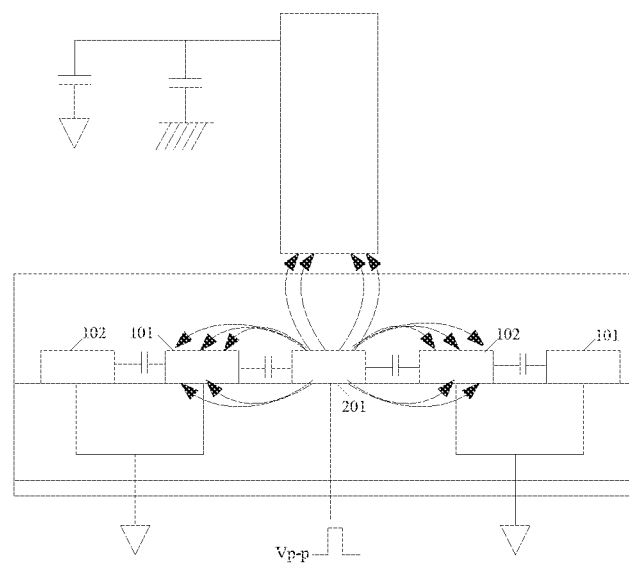
FIG. 4 is a schematic diagram of a circuit structure of an exemplary in-cell display module.

In the in-cell display module, the touch electrode 201 may be reused as the common electrode in a time division manner. Since the touch electrode 201 is disposed inside the display panel, stray capacitance is easily generated between the gate and data lines 101 and 102 in the display panel and the touch electrode 201. which affects the signal-to-noise ratio of the touch signal. FIG. 4 is a schematic diagram of a circuit structure of an exemplary in-cell display module. As shown in FIG. 4, in the process of the stylus contacting the display panel, the stray capacitance between the touch electrode and the gate and data lines has the following effect: $\Delta Qx=\Delta U*Cx$, where $\Delta Qx$ is the charge amount between the touch electrode and the gate and data lines, $\Delta U$ is the charging voltage of the touch electrode, and Cx is the capacitance between the touch electrode and the gate and data lines. The capacitance between the touch electrode and the stylus has the following effect: $\Delta Qt=\Delta U*Ct$, where $\Delta Qt$ is the charge amount between the touch electrode and the stylus, AU is the charging voltage of the touch electrode, and Ct is the capacitance between the stylus and the touch electrode. Sensitivity of the stylus is as follows: $a=\Delta Qt/\Delta Qx=(\Delta U*Ct)/(\Delta U*Cx)=Ct/Cx$. According to the requirement of the touch function, the larger the ratio of Ct to Cx is, the better the touch performance is. However, Cx cannot continue to be reduced under the current process conditions, and Ct cannot be artificially increased because it is only affected by the user's own conditions. Therefore, the touch sensitivity is limited.

Figure 5:
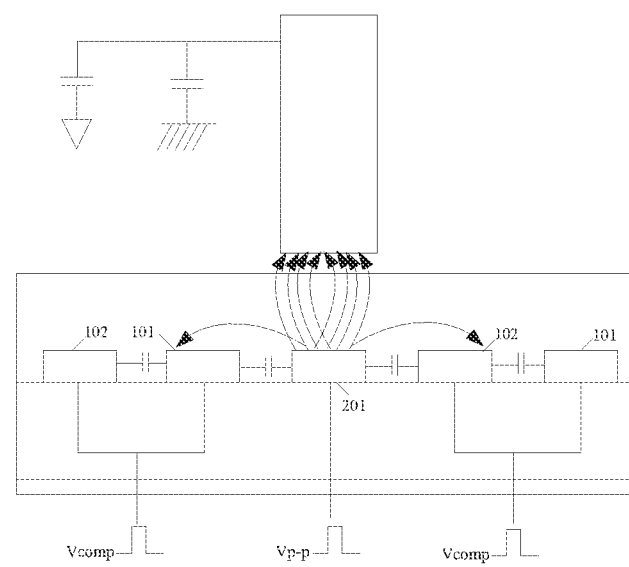
FIG. 5 is a schematic diagram of a circuit structure of an exemplary improved in-cell display module.

FIG. 5 is a schematic diagram of a circuit structure of an exemplary improved in-cell display module. As shown in FIG. 5, in the touch stage, signals with the same waveform as the touch signal are applied to the gate line 101 and the data line 102, so that the voltage difference between the touch electrode 201 is and the gate and data lines 101 and 102 can be reduced, thereby canceling the influence of the stray capacitance on the touch performance. Specifically, the influence of the stray capacitance between the touch electrode and the gate and data lines is as follows: $\Delta Qx=(\Delta U-VCOMP)*Cx$, where VCOMP is a voltage applied to the touch electrodes of a row adjacent to an Nth row when the touch electrodes of the Nth row are scanned. The capacitance between the touch electrode and the stylus has the following effect: $\Delta Qt=\Delta U*Ct$. Sensitivity of the stylus is as follows: $b=\Delta Qt/\Delta Qx=\Delta U*Ct/(\Delta U-COMP)*Cx)=(Ct/Cx)*(\Delta U/(\Delta U-VCOMP))$. Compared with the in-cell display module shown in FIG. 4, the improved in-cell display module has an increased amount of effective charges involved in touch response, and the trend is as follows: $\alpha=b/a=(Ct/Cx)*(\Delta U/(\Delta U-VCOMP))/Ct/Cx=\Delta U/(\Delta U-VCOMP)$. The sensitivity of the stylus is positively correlated with the value of $\alpha$, and thus, the amount of effective charges can be increased by adjusting VCOMP, so as to improve the sensitivity of the stylus.

It can be seen that the influence of the stray capacitance on the sensitivity of the stylus can be reduced by applying signals with the same waveform as the touch signal to the gate line 101 and the data line 102, so that the sensitivity of the stylus is improved to a certain extent, the stylus' capability of receiving the uplink signal is ensured, and the normal operation of subsequent touch control is further ensured. However, due to the structural limitation of the stylus, the stylus tip cannot infinitely increase, and when the signal volume of the uplink signal still cannot guarantee the stable signal transmission of the stylus, the usual method for increasing the signal volume is to increase the active level of the uplink signal (that is, the peak-to-peak value Vp-p of the uplink signal), so as to ensure that the stylus can receive a relatively higher signal, and further ensure the accuracy of information transmission. Although the increase of the peak-to-peak value Vp-p of the uplink signal results in increased accuracy of signal transmission, when a finger performs touch control, the touch electrode is also operated by the uplink signal with the peak-to-peak value Vp-p. In this case, when a finger performs touch control, a too high active level can bring about significant increase in power consumption, and a touch driving signal with a too high active level can also have negative effects on the promotion of refresh frequency, thereby hindering the promotion of refresh frequency of the display panel.

In order to at least partially solve one of the above technical problems, the present disclosure provides a method for driving a display panel, a display module and a display device. The method for driving a display panel, the display module and the display device according to the embodiments of the present disclosure will be described in detail below with reference to the accompanying drawings and the specific embodiments.

The embodiments of the present disclosure provide a method for driving a display panel, which includes: in a touch stage, providing a touch signal to a touch electrode through a touch signal line. The touch stage includes: a first touch sub-stage and a second touch sub-stage spaced from each other. The touch signal includes: an uplink signal and a touch driving signal, and an active level of the uplink signal is greater than that of the touch driving signal. In the first touch sub-stage, the uplink signal is provided to the touch electrode through the touch signal line; and in the second touch sub-stage, the touch driving signal is provided to the touch electrode through the touch signal line.

Figure 6:
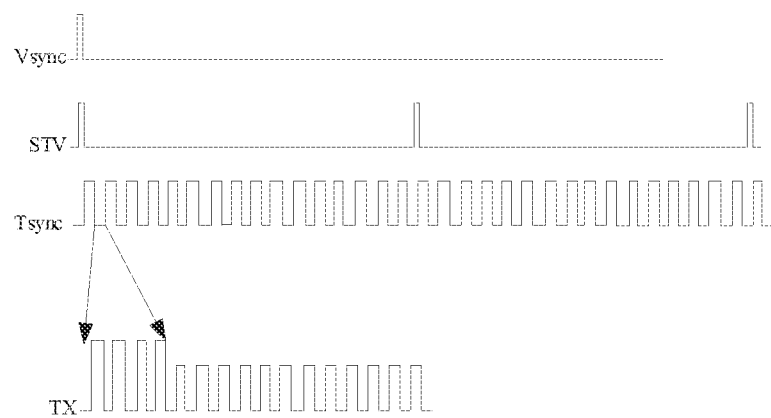
FIG. 6 is a timing diagram for driving a display panel according to an embodiment of the present disclosure.

FIG. 6 is a timing diagram for driving a display panel according to an embodiment of the present disclosure. As shown in FIG. 6, a frame start signal STV is used as a trigger signal for each frame of display image; a touch synchronization signal Tsync is used as a signal for distinguishing a display stage from a touch stage, for example, a high level stage of the touch synchronization signal Tsync is a display stage, and a low level stage of the touch synchronization signal Tsync is a touch stage; a vertical synchronization signal Vsync is a signal generated with reference to the touch synchronization signal Tsync. The touch synchronization signal Tsync has a fixed number of pulses between any two adjacent pulses of the frame start signal STV according to the protocol requirement. For example, in the MPP2.5 protocol, the touch synchronization signal Tsync has 16 pulses between any two adjacent pulses of the frame start signal STV, and one uplink signal is transmitted every 16 pulses of the touch synchronization signal Tsync. In the embodiment of the present disclosure, the frame start signal STV and the touch synchronization signal Tsync are used as time references, and the uplink signal or the touch driving signal is provided to each touch electrode through the touch signal line according to the protocol requirement. When the touch synchronization signal Tsync is at a low level, the uplink signal is supplied to the touch electrode through the touch signal line Tx (202) in the first touch sub-stage, and the touch driving signal is supplied to the touch electrode through the touch signal line Tx (202) in the second touch sub-stage.

According to the method for driving the display panel in the embodiments of the present disclosure, in the first touch sub-stage, when the stylus approaches or comes into contact with the display panel, the stylus can detect the uplink signal provided from the touch electrode of the display panel, so that the subsequent synchronization can be performed according to the setting, and it is ensured that the touch function can be implemented by the stylus. In the second touch sub-stage, the touch driving signal is provided to the touch electrode of the display panel, and the active level of the touch driving signal is smaller than that of the uplink signal, so that the power consumption can be decreased on the basis of ensuring the touch function, and the negative influence of the too high active level on the promotion of the refresh frequency can be avoided, thereby improving the refresh frequency and the display effect of the display panel.

In some embodiments, the display panel further includes a plurality of pixel electrodes, and the method further includes: in a display stage, providing a data signal to the pixel electrode. The touch stage includes a plurality of touch sub-stages containing the first touch sub-stage and the second touch sub-stage, the display stage includes a plurality of display sub-stages, and the plurality of is touch sub-stages alternate with the plurality of display sub-stages.

In some embodiments, the first 1~2 touch sub-stages of the plurality of touch sub-stages each are the first touch sub-stage, and the remaining touch sub-stages of the plurality of touch sub-stages each are the second touch sub-stage.

In some embodiments, the plurality of touch sub-stages contains only one first touch sub-stage, and the uplink signal is provided to the touch electrode in a part of the first touch sub-stage; and the touch driving signal is provided to the touch electrode in the rest of the first touch sub-stage. In the entire second touch sub-stage, the touch driving signal is provided to the touch electrode.

In some embodiments, the number of pulses of the touch synchronization signal within a display time of one frame is set to N, where N is an integer greater than 1; when the touch synchronization signal and the vertical synchronization signal are both at active levels, the number of pulses of the touch synchronization signal starts to be counted; a modulation signal having a first level and a second level is provided when the number of pulses of the touch synchronization signal is counted to N; the uplink signal is provided to the touch electrode in response to the first level of the modulation signal; and the touch driving signal is provided to the touch electrode in response to the second level of the modulation signal.

It should be noted that the number of pulses of the touch synchronization signal in the display time of one frame may be set to different values according to different protocols. For example, in the MPP2.5 protocol, the number of the pulses of the touch synchronization signal Tsync in the display time of one frame may be set to 16. Although the touch synchronization signal Tsync is powered on in advance, because the active touch synchronization signal Tsync starts from the active frame start signal STV, the timing at which the active counting of the touch synchronization signal Tsync starts needs to be defined by the relationship between the vertical synchronization signal Vsync and the touch synchronization signal Tsync in the power-on stage. After the start of the active counting, if the number of pulses of the touch synchronization signal Tsync corresponding to each frame is 16, (16+1) pulse falling edges of the touch synchronization signal Tsync are counted by a counter. When the number of pulses of the touch synchronization signal is counted to 16, the modulation signal having the first level and the second level is provided. The uplink signal is provided to the touch electrode in response to the first level of the modulation signal; and the touch driving signal is provided to the touch electrode in response to the second level of the modulation signal. The duration of the first level is the time for providing the uplink signal to the touch electrode, and the duration of the second level is the time for providing the touch driving signal to the touch electrode. In some embodiments, the duration of the first level corresponds to 1 or 2 pulses of the touch synchronization signal Tsync. In some embodiments, the duration of the first level corresponds to less than one pulse of the touch synchronization signal Tsync. Therefore, by means of the modulation signal, independent control of the uplink signal and the touch driving signal is achieved, and switching between the uplink signal and the touch driving signal is achieved, so that accuracy of information transmission can be guaranteed through the uplink signal with the high active level, while power consumption can be reduced through the touch driving signal with the low active level, thereby improving competitiveness of products.

In some embodiments, the display panel further includes a plurality of gate lines and a plurality of data lines intersecting with each other to define a plurality of pixel units, and the method further includes: applying signals with the same waveform as the touch signal to the plurality of gate lines and the plurality of data lines in the touch stage.

In some embodiments, in the display stage, the touch electrode is reused as a common electrode; the touch signal line is reused as a common signal line; and the method for driving the display panel further includes: in the display stage, providing a common signal to the touch electrode through the touch signal line.

By taking a liquid crystal display panel as an example, in the display stage, a data signal may be provided to the pixel electrode, while a common signal is provided to the common electrode, so that an electric field is formed between the pixel electrode and the common electrode to drive liquid crystal molecules between the pixel electrode and the common electrode to deflect, thereby realizing the display function.

The embodiments of the present disclosure further provide a display module, including: a display panel and a driving circuit. The display panel includes: a plurality of touch electrodes and a plurality of touch signal lines coupled to the touch electrodes. The driving circuit is configured to: in a touch stage, provide a touch signal to the touch electrode through the touch signal line. The touch stage includes: a first touch sub-stage and a second touch sub-stage spaced from each other. The touch signal includes: an uplink signal and a touch driving signal, and an active level of the uplink signal is greater than that of the touch driving signal. The driving circuit is configured to: in the first touch sub-stage, provide the uplink signal to the touch electrode through the touch signal line; and in the second touch sub-stage, provide the touch driving signal to the touch electrode through the touch signal line.

It should be noted that the driving circuit can provide the uplink signal and the touch driving signal for the display panel; in the first touch sub-stage, when the stylus is close to or in contact with the display panel, the stylus may detect the uplink signal provided from the touch electrode of the display panel, so that synchronization may be performed subsequently according to the setting, and it is ensured that the touch function can be implemented by the stylus. In the second touch sub-stage, the touch driving signal is provided to the touch electrode of the display panel, and the active level of the touch driving signal is smaller than that of the uplink signal, so that the power consumption can be reduced on the basis of ensuring the touch function, and the negative influence of the too high active level on the promotion of the refresh frequency can be avoided, thereby promoting the refresh frequency of the display panel, and improving the display effect.

Figure 7:
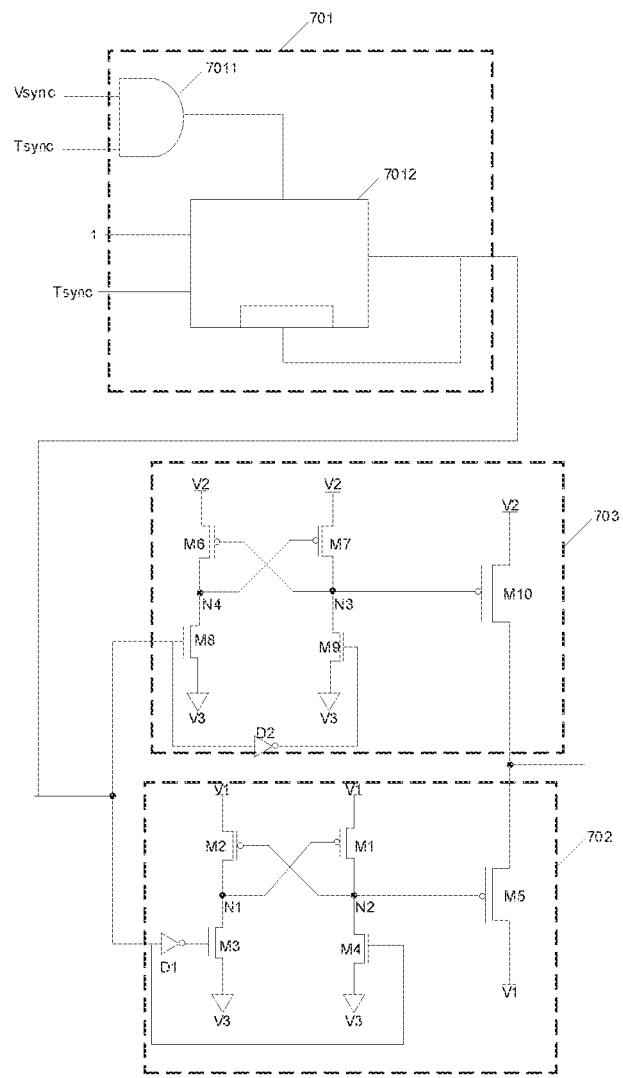
FIG. 7 is a schematic diagram of a structure of a driving circuit according to an embodiment of the present disclosure.

FIG. 7 is a schematic diagram of a structure of a driving circuit according to an embodiment of the present disclosure. In some embodiments, as shown in FIG. 7, the driving circuit includes: a modulation sub-circuit 701, a first selection sub-circuit 702 and a second selection sub-circuit 703. The modulation sub-circuit 701 is configured to generate a modulation signal having a first level and a second level; a duration of the first level is the same as a time during which the uplink signal is provided to the touch electrode; a duration of the second level is the same as a time during which the touch driving signal is provided to the touch electrode. The first selection sub-circuit 702 is configured to generate the uplink signal using a first power supply voltage signal according to the first level of the modulation signal; the second selection sub-circuit 703 is configured to generate the touch driving signal using a second power supply voltage signal according to the second level of the modulation signal.

In an embodiment of the present disclosure, the modulation sub-circuit 701 includes: a gate circuit 7011 and a counter 7012. A first input terminal of the gate circuit 7011 is configured to receive the touch synchronization signal Tsync, a second input terminal of the gate circuit 7011 is configured to receive the vertical synchronization signal Vsync, and an output terminal of the gate circuit 7011 is coupled to a first input terminal of the counter 7012. The gate circuit 7011 is configured to output a start signal in response to the touch synchronization signal Tsync and the vertical synchronization signal Vsync both being at active levels. A second input terminal of the counter 7012 is configured to receive the touch synchronization signal Tsync, a third input terminal of the counter 7012 is coupled to a counting signal terminal 1, and an output terminal of the counter 7012 is coupled to the first selection sub-circuit 702 and the second selection sub-circuit 703. The counter 7012 is configured to: start counting the number of pulses of the touch synchronization signal Tsync in response to the start signal; and output the modulation signal through the output terminal in response to counting the number of pulses of the touch synchronization signal Tsync to N. The first selection sub-circuit 702 includes: a first diode D1, a first transistor M1, a second transistor M2, a third transistor M3, a fourth transistor M4, and a fifth transistor M5. A first electrode of the first diode D1 is coupled to the output terminal of the modulation sub-circuit 701 and a control electrode of the fourth transistor M4, and a second electrode of the first diode D1 is coupled to a control electrode of the third transistor M3; a control electrode of the first transistor M1 is coupled to a first node N1, a first electrode of the first transistor M1 is coupled to a first power supply voltage terminal V1, and a second electrode of the first transistor M1 is coupled to a second node N2; the first node N1 is a connection point of the control electrode of the first transistor M1, a second electrode of the second transistor M2, and a first electrode of the third transistor M3; the second node N2 is a connection point of a control electrode of the second transistor M2, the second electrode of the first transistor M1, and a first electrode of the fourth transistor M4 and a control electrode of the fifth transistor M5; the control electrode of the second transistor M2 is coupled to the second node N2, a first electrode of the second transistor M2 is coupled to the first power supply voltage terminal V1, and the second electrode of the second transistor M2 is coupled to the first node N1; the control electrode of the third transistor M3 is coupled to the second electrode of the first diode D1, the first electrode of the third transistor M3 is coupled to the first node N1, and a second electrode of the third transistor M3 is coupled to a third power supply voltage terminal V3; the control electrode of the fourth transistor M4 is coupled to the first electrode of the first diode D1, the first electrode of the fourth transistor M4 is coupled to the second node N2, and a second electrode of the fourth transistor M4 is coupled to the third power supply voltage terminal V3; the control electrode of the fifth transistor M5 is coupled to the second node N2, a first electrode of the fifth transistor M5 is coupled to the first power supply voltage terminal V1, and a second electrode of the fifth transistor M5 is coupled to the touch signal line. The second selection sub-circuit 703 includes: a second diode D2 a sixth transistor M6, a seventh transistor M7, an eighth transistor M8, a ninth transistor M9, and a tenth transistor M10. A first electrode of the second diode D2 is coupled to the output terminal of the modulation sub-circuit 701 and a control electrode of the eighth transistor M8, and a second electrode of the second diode D2 is coupled to a control electrode of the ninth transistor M9; a control electrode of the sixth transistor M6 is coupled to a third node N3, a first electrode of the sixth transistor M6 is coupled to a second power supply voltage terminal V2, and a second electrode of the sixth transistor M6 is coupled to a fourth node N4; the third node N3 is a connection point of the control electrode of the sixth transistor M6, a second electrode of the seventh transistor M7, a first electrode of the ninth transistor M9 and a control electrode of the tenth transistor M10; the fourth node N4 is a connection point of a control electrode of the seventh transistor M7, the second electrode of the sixth transistor M6 and a first electrode of the eighth transistor M8; the control electrode of the seventh transistor M7 is coupled to the fourth node N4 a first electrode of the seventh transistor M7 is coupled to the second power supply voltage terminal V2, and the second electrode of the seventh transistor M7 is coupled to the third node N3; the control electrode of the eighth transistor M8 is coupled to the first electrode of the second diode D2 and the output terminal of the modulation sub-circuit 701, the first electrode of the eighth transistor M8 is coupled to the fourth node N4, and a second electrode of the eighth transistor M8 is coupled to the third power supply voltage terminal V3; the control electrode of the ninth transistor M9 is coupled to the second electrode of the second diode D2, the first electrode of the ninth transistor M9 is coupled to the third node N3, and a second electrode of the ninth transistor M9 is coupled to the third power supply voltage terminal V3; the control electrode of the tenth transistor M10 is coupled to the third node N3, a first electrode of the tenth transistor M10 is coupled to the second power supply voltage terminal V2, and a second electrode of the tenth transistor M10 is coupled to the touch signal line.

It should be noted that, in the embodiment of the present disclosure, the first transistor M1, the second transistor M2, the fifth transistor M5, the sixth transistor M6, the seventh transistor M7, and the tenth transistor M10 may all be P-type transistors, and the third transistor M3, the fourth transistor M4, the eighth transistor M8, and the ninth transistor M9 may all be N-type transistors. The voltage of the first power supply voltage terminal V1 is higher than the voltage of the second power supply voltage terminal V2, and the voltage of the second power supply voltage terminal V2 is higher than the voltage of the third power supply voltage terminal V3. When the modulation signal is at the first level, i.e., at the high level, the eighth transistor M8 is turned on, and the ninth transistor M9 is turned off, so that the potential of the fourth node N4 is pulled to 0V, the seventh transistor M7 is turned on, the sixth transistor M6 is turned off, and thus the potential of the third node N3 is the potential of the second power supply voltage terminal V2, causing the tenth transistor M10 to be turned off. Meanwhile, the fourth transistor M4 is turned on, and the third transistor M3 is turned off, so that the potential of the first node N1 is pulled to 0V, the first transistor M1 is turned on, the second transistor M2 is turned off, and thus, the potential of the second node N2 is pulled to 0V causing the fifth transistor M5 to be turned on. As a result, the first power supply voltage signal is output, and the uplink signal is generated. Similarly, when the modulation signal is at the second level, i.e., at the low level, the second power supply voltage signal may be output by controlling the states of the transistors to generate the touch driving signal. The operation principle is similar to the above, and will not, be repeated here.

The embodiments of the present disclosure also provide a display device, which includes the display module according to by any one of the above embodiments. The display device may be a mobile phone, a notebook computer, a tablet computer, a smart television and other terminal devices. The operation principle of the display device is similar to that of the display module, and is not repeated herein.

It could be understood that the above embodiments are merely exemplary is embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

What is claimed is:

1. A method for driving a display panel, wherein the display panel comprises a touch electrode, and the method comprises:

in a touch stage, providing a touch signal to the touch electrode;

wherein the touch stage comprises: a first touch sub-stage and a second touch sub-stage spaced from each other; the touch signal comprises: an uplink signal and a touch driving signal, and an active level of the uplink signal is greater than an active level of the touch driving signal; and in the first touch sub-stage, the uplink signal is provided to the touch electrode; and in the second touch sub-stage, the touch driving signal is provided to the touch electrode, wherein a number of pulses of a touch synchronization signal within a display time of one frame is N, where N is an integer greater than 1;

in response to the touch synchronization signal and a vertical synchronization signal being both at active levels, the number of pulses of the touch synchronization signal starts to be counted;

in response to the number of pulses of the touch synchronization signal being counted to N, a modulation signal having a first level and a second level is provided;

in response to the first level of the modulation signal, the uplink signal is provided to the touch electrode; and in response to the second level of the modulation signal, the touch driving signal is provided to the touch electrode.

2. The method of claim 1, wherein the display panel further comprises a pixel electrode, and the method further comprises:

in a display stage, providing a data signal to the pixel electrode;

wherein the touch stage comprises a plurality of touch sub-stages containing the first touch sub-stage and the second touch sub-stage, the display stage comprises a plurality of display sub-stages, and the plurality of touch sub-stages alternate with the plurality of display sub-stages.

3. The method of claim 2, wherein the first 1~2 touch sub-stages of the plurality of touch sub-stages each are the first touch sub-stage, and the rest of the touch sub-stages each are the second touch sub-stage.

4. The method of claim 2, wherein the plurality of touch sub-stages comprises only one first touch sub-stage, in a part of the first touch sub-stage, the uplink signal is provided to the touch electrode; and in the remaining part of the first touch sub-stage, the touch driving signal is provided to the touch electrode, and in the entire second touch sub-stage, the touch driving signal is provided to the touch electrode.

5. The method of claim 1, wherein the display panel further comprises a plurality of gate lines and a plurality of data lines intersecting with each other to define a plurality of pixel units, and the method further comprises:

applying signals with the same waveform as the touch signal to the plurality of gate lines and the plurality of data lines in the touch stage.

6. The method of claim 2, further comprising: in the display stage, providing a common level signal to the touch electrode.

7. A display module, comprising: a display panel and a driving circuit, the display panel comprising a touch electrode, the driving circuit being configured to provide a touch signal to the touch electrode in a touch stage,
wherein the touch stage comprises: a first touch sub-stage and a second touch sub-stage spaced from each other; the touch signal comprises: an uplink signal and a touch driving signal, and an active level of the uplink signal is greater than an active level of the touch driving signal; and
the driving circuit is configured to: provide the uplink signal to the touch electrode in the first touch sub-stage; and provide the touch driving signal to the touch electrode in the second touch sub-stage,
wherein the driving circuit comprises: a modulation sub-circuit, a first selection sub-circuit, and a second selection sub-circuit;
the modulation sub-circuit is configured to generate a modulation signal having a first level and a second level; a duration of the first level is the same as a time during which the uplink signal is applied to the touch electrode; a duration of the second level is the same as a time during which the touch driving signal is provided to the touch electrode;
the first selection sub-circuit is configured to generate the uplink signal using a first power supply voltage signal according to the first level of the modulation signal; and
the second selection sub-circuit is configured to generate the touch driving signal using a second power supply voltage signal according to the second level of the modulation signal.

8. The display module of claim 7, wherein the modulation sub-circuit comprises: a gate circuit and a counter;
a first input terminal of the gate circuit is configured to receive a touch synchronization signal, a second input terminal of the gate circuit is configured to receive a vertical synchronization signal, an output terminal of the gate circuit is coupled to a first input terminal of the counter, and the gate circuit is configured to output a start signal through the output terminal in response to the touch synchronization signal and the vertical synchronization signal both being at active levels; and
a second input terminal of the counter is configured to receive the touch synchronization signal, a third input terminal of the counter is coupled to a counting signal terminal, an output terminal of the counter is coupled to the first selection sub-circuit and the second selection sub-circuit, and the counter is configured to start counting a number of pulses of the touch synchronization signal in response to the start signal; and output the modulation signal through the output terminal in response to the number of pulses of the touch synchronization signal being counted to N.

9. The display module of claim 8, wherein the first selection sub-circuit comprises: a first diode, a first transistor, a second transistor, a third transistor, a fourth transistor, and a fifth transistor;
a first electrode of the first diode is coupled to an output terminal of the modulation sub-circuit and a control electrode of the fourth transistor, and a second electrode of the first diode is coupled to a control electrode of the third transistor;
a control electrode of the first transistor is coupled to a first node, a first electrode of the first transistor is coupled to a first power supply voltage terminal, and a second electrode of the first transistor is coupled to a second node;
a control electrode of the second transistor is coupled to the second node, a first electrode of the second transistor is coupled to the first power supply voltage terminal, and a second electrode of the second transistor is coupled to the first node;
a first electrode of the third transistor is coupled to the first node, and a second electrode of the third transistor is coupled to a third power supply voltage terminal;
a first electrode of the fourth transistor is coupled to the second node, and a second electrode of the fourth transistor is coupled to the third power supply voltage terminal; and
a control electrode of the fifth transistor is coupled to the second node, a first electrode of the fifth transistor is coupled to the first power supply voltage terminal, a second electrode of the fifth transistor is coupled to a touch signal line, and the touch signal line is coupled to the touch electrode.

10. The display module of claim 9, wherein the second selection sub-circuit comprises: a second diode, a sixth transistor, a seventh transistor, an eighth transistor, a ninth transistor, and a tenth transistor;
a first electrode of the second diode is coupled to the output terminal of the modulation sub-circuit and a control electrode of the eighth transistor, and a second electrode of the second diode is coupled to a control electrode of the ninth transistor;
a control electrode of the sixth transistor is coupled to a third node, a first electrode of the sixth transistor is coupled to a second power supply voltage terminal, and a second electrode of the sixth transistor is coupled to a fourth node;
a control electrode of the seventh transistor is coupled to the fourth node, a first electrode of the seventh transistor is coupled to the second power supply voltage terminal, and a second electrode of the seventh transistor is coupled to the third node;
a first electrode of the eighth transistor is coupled to the fourth node, and a second electrode of the eighth transistor is coupled to the third power supply voltage terminal;
a first electrode of the ninth transistor is coupled to the third node, and a second electrode of the ninth transistor is coupled to the third power supply voltage terminal; and
a control electrode of the tenth transistor is coupled to the third node, a first electrode of the tenth transistor is coupled to the second power supply voltage terminal, and a second electrode of the tenth transistor is coupled to the touch signal line.

11. The display module of claim 10, wherein the first transistor, the second transistor, the fifth transistor, the sixth transistor, the seventh transistor, and the tenth transistor are all P-type transistors, and the third transistor, the fourth transistor, the eighth transistor, and the ninth transistor are all N-type transistors.

12. The display module of claim 11, wherein a voltage of the first power supply voltage terminal is higher than a voltage of the second power supply voltage terminal, and the voltage of the second power supply voltage terminal is higher than a voltage of the third power supply voltage terminal.

13. A display device, comprising the display module of claim 7.

\* \* \* \* \*